(12) United States Patent
Berger et al.

(10) Patent No.: US 7,917,349 B2
(45) Date of Patent: Mar. 29, 2011

(54) COMBINED HARDWARE AND SOFTWARE INSTRUMENT SIMULATOR FOR USE AS A TEACHING AID

(75) Inventors: Steven Berger, Newburyport, MA (US);
Colin August Sanford, Atkinson, NH (US)

(73) Assignee: FEI Company, Hillsboro, OR (US)

( * ) Notice: Subject to any disclaimer, the term of this patent is extended or adjusted under 35 U.S.C. 154(b) by 576 days.

(21) Appl. No.: 11/454,293

(22) Filed: Jun. 17, 2006

(65) Prior Publication Data

US 2007/0020605 A1    Jan. 25, 2007

Related U.S. Application Data

(60) Provisional application No. 60/691,880, filed on Jun. 17, 2005.

(51) Int. Cl.
| | |
|---|---|
| *G06K 9/00* | (2006.01) |
| *G06G 7/48* | (2006.01) |
| *G06G 7/58* | (2006.01) |
| *G06F 9/45* | (2006.01) |
| *G06F 15/177* | (2006.01) |
| *G01N 37/00* | (2006.01) |
| *G09B 23/28* | (2006.01) |
| *G09B 23/00* | (2006.01) |
| *G09B 25/00* | (2006.01) |

(52) U.S. Cl. ............ 703/22; 703/6; 703/11; 702/84; 707/100; 709/220; 382/100; 382/128; 382/133; 434/276; 434/296; 434/365; 434/369

(58) Field of Classification Search .......... 703/22, 703/6, 11; 702/84; 709/220; 382/100, 128, 382/133

See application file for complete search history.

(56) References Cited

U.S. PATENT DOCUMENTS

| | | | | |
|---|---|---|---|---|
| 4,127,752 A | * | 11/1978 | Lowthorp | 200/5 A |
| 4,723,914 A | * | 2/1988 | Tachibana | 434/297 |
| 5,243,693 A | | 9/1993 | Maron et al. | |
| 5,428,690 A | * | 6/1995 | Bacus et al. | 382/128 |
| 5,609,485 A | * | 3/1997 | Bergman et al. | 434/262 |
| 5,749,735 A | * | 5/1998 | Redford et al. | 434/307 R |
| 5,766,016 A | * | 6/1998 | Sinclair et al. | 434/262 |
| 5,769,640 A | * | 6/1998 | Jacobus et al. | 434/262 |
| 5,800,178 A | * | 9/1998 | Gillio | 434/262 |
| 5,855,483 A | * | 1/1999 | Collins et al. | 434/322 |
| 6,055,095 A | * | 4/2000 | Bawolek | 359/350 |
| 6,055,487 A | * | 4/2000 | Margery et al. | 702/84 |
| 6,155,840 A | * | 12/2000 | Sallette | 434/323 |

(Continued)

OTHER PUBLICATIONS

Beynon et al. "The Virtual Microscope", IEEE Transactions on Information Technology in Biomedicine, vol. 7, No. 4, Dec. 2003.*

(Continued)

*Primary Examiner* — Kamini S Shah
*Assistant Examiner* — Shambhavi Patel
(74) *Attorney, Agent, or Firm* — Scheinberg & Griner, LLP; David Griner; Michael O. Scheinberg

(57) ABSTRACT

An improved simulator for an analytical instrument that provides the student with an experience similar to that of operating the actual instrument. In one preferred embodiment, the invention combines real functionality and simulated functionality where at least one function of the analytical instrument is real. In another preferred embodiment, the invention combines a functional first instrument along with a simulation of a second instrument, the simulation including both hardware with limited functionality and software that simulates the output of a functional instrument to create a teaching aid for use in classrooms and teaching laboratories.

25 Claims, 3 Drawing Sheets

U.S. PATENT DOCUMENTS

| | | | |
|---|---|---|---|
| 6,272,235 B1* | 8/2001 | Bacus et al. | 382/133 |
| 6,669,484 B1* | 12/2003 | Lund et al. | 434/276 |
| 6,783,367 B1* | 8/2004 | Wang et al. | 434/276 |
| 6,929,481 B1* | 8/2005 | Alexander et al. | 434/262 |
| 6,991,374 B2* | 1/2006 | Salmon et al. | 382/128 |
| 7,056,123 B2* | 6/2006 | Gregorio et al. | 434/272 |
| 7,110,586 B2* | 9/2006 | Bacus et al. | 382/128 |
| 7,146,372 B2* | 12/2006 | Bacus et al. | 1/1 |
| 7,218,762 B2 | 5/2007 | Olschewski | |
| 2001/0045506 A1* | 11/2001 | Masuyama | 250/201.3 |
| 2002/0147799 A1* | 10/2002 | Alhalabi et al. | 709/220 |
| 2002/0168618 A1* | 11/2002 | Anderson et al. | 434/262 |
| 2002/0193975 A1* | 12/2002 | Zimmerman | 703/6 |
| 2003/0018457 A1* | 1/2003 | Lett et al. | 703/11 |
| 2003/0033126 A1* | 2/2003 | Lincoln et al. | 703/11 |
| 2003/0155494 A1* | 8/2003 | Olschewski | 250/234 |
| 2004/0009459 A1* | 1/2004 | Anderson et al. | 434/262 |
| 2004/0152053 A1* | 8/2004 | Bardige et al. | 434/118 |
| 2004/0227937 A1 | 11/2004 | Richardson | |
| 2004/0254771 A1* | 12/2004 | Riener et al. | 703/7 |
| 2005/0069858 A1 | 3/2005 | Lapa et al. | |
| 2005/0116182 A1 | 6/2005 | Tanaka et al. | |
| 2005/0117816 A1 | 6/2005 | Saeger et al. | |
| 2006/0127864 A1* | 6/2006 | Ohlsson | 434/219 |
| 2006/0127867 A1* | 6/2006 | Grund-Pedersen | 434/267 |

OTHER PUBLICATIONS

Romer et al. "Using a Modified Standard Microscope to Generate Virtual Slides". The Anatomical Record (Part B: New Anat.) 2728:91-97, 2003.*

Dee et al. "Implementation of Virtual Microscope Slides in the Annual Pathobiology of Cancer Workshop Laboratory", 2003.*

Ferreira et al. "The Virtual Microscope", 1998.*

Harris et al. "Comparison of a Virtual Microsocope Laboratory to a Regular Microscope Laboratory for Teaching Histrology", The Anatomical Record, 2001.*

"Heidger et al. ntegrated Approach to Teaching and Testing in Histology with Real and Virtual Imaging", The Anatomica Record, 2002.*

Steinberg et al. "Application of Virtual Microscopy in Clinical Cytopathology", Diagnostic Cytopathology, 2001.* www.virtualsem.com webpages 1pp, 2005.

www.sciencedaily.com/releases/2005/05/050527110546.htm webpages, 2pp, 2005.

http:// micro.magnet.fsu.edu/primer/java/electronmicroscopy/magnify1/index.html. webpages 2pp, 2006.

* cited by examiner

COMBINED HARDWARE AND SOFTWARE INSTRUMENT SIMULATOR FOR USE AS A TEACHING AID

This application claims priority from U.S. Provisional Application No. 60/691,880 filed on Jun. 17, 2005, which is incorporated by reference.

TECHNICAL FIELD OF THE INVENTION

The present invention relates to an educational aid for teaching students about analytical instruments.

BACKGROUND AND SUMMARY OF THE INVENTION

The potential applications of nanotechnology are pervasive and the expected impact on society is huge. Nanotechnology holds the promise of scientific breakthroughs in a wide range of fields and has immense potential for industry and manufacturing, computers, healthcare, and the environment. The preparation of nanotechnology workforce for the next decade is a major challenge for the progress of the new technology. It is estimated that about 2 million workers will be needed worldwide in 10-15 years from now. Unfortunately, the process of teaching students about nanotechnology and the tools and instruments used in the field can be a difficult proposition. Most of the critical tools for nanotechnology, such as electron microscopes, atomic force microscopes, or ion beam systems, are prohibitively expensive. Further, such instrumentation is complex and difficult to maintain. Many teachers, especially in K through 12, undergraduate, or non-traditional education, do not have expertise or familiarity with these instruments or their operation. As a result, such instrumentation is typically unavailable for most students below the advanced graduate level.

There are a number of electron microscope simulators available that are designed for use in schools. See, for example, virtual microscopy web pages by Michael W. Davidson and The Florida State University Research Foundation, Tallahasse Fla., at: http://micro.magnet.fsu.edu/primer/java/electronmicroscopy/magnify1/index.html As far as Applicants are aware, however, all of the simulators developed to date are purely software simulators. Software simulations do not provide students with the feeling of actually operating the instrument. Further, the limited skills that can be learned by students operating software simulators do not translate well to real world applications. Certainly, training on a prior are software simulator would not provide adequate training to teach a student how to operate an actual instrument.

What is needed is a simulated instrument that more closely mimics the operation of an instrument such as an electron microscope in order to more faithfully reproduce the experience of running a real machine for students. In a preferred embodiment, such a simulated instrument could also be modeled after an actual instrument so that students operating the simulator could be trained to operate the actual instrument.

SUMMARY OF THE INVENTION

An object of the invention is to provide a simulator for an analytical instrument that provides the student with an experience similar to that of operating the actual instrument.

In a preferred embodiment, the invention combines a functional, first instrument along with a simulation of a second instrument, the simulation including both hardware with limited functionality and software to create a teaching aid for use in classrooms and teaching laboratories.

In a preferred embodiment, a first instrument produces live images or other live output of a sample. The second instrument does not produce live output; instead, simulated output of the second instrument is generated by a computer running simulation software. The computer simulated output can consist, for example, of images can be derived from previously produced and stored real images of the same or a similar sample, or simulated images can be created entirely by the computer. As a user operates controls on the hardware portion of the simulator, the computer generated simulated images change in a manner similar to the way in which the images of a fully functional instrument change. Thus, the students get the "feel" of the instrument and see how changing one operating parameter of the instrument affects other operating parameters, and learn how to compensate for the changes.

The invention can provide students with experience operating a relatively expensive instrument at significantly lower cost than providing fully functional hardware. The invention thus can be priced within typical academic budgets, while the presence of some functional hardware provides a significantly higher degree of reality and hence a greater learning value due to the fact that it closely mimics the operation of a fully functional instrument.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF PREFERRED EMBODIMENTS

Figure 1:
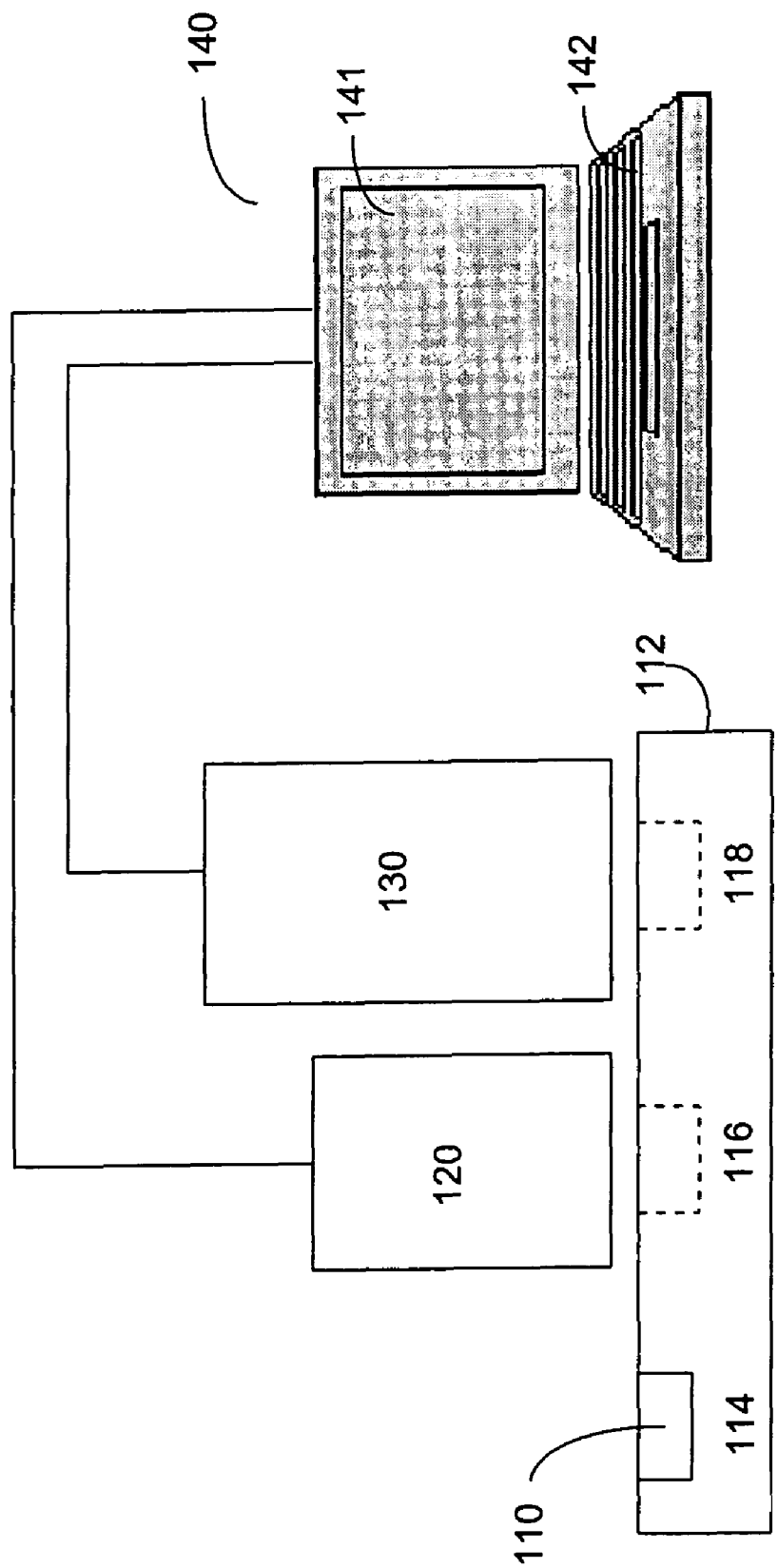
FIG. 1 shows a diagram of a preferred embodiment of the present invention where an optical microscope is combined with a scanning electron microscope simulator.

In a preferred embodiment, the invention combines a functional first instrument along with a simulation of a second instrument, the simulation including both hardware with limited functionality and software that simulates the output of a functional instrument to create a teaching aid for use in classrooms and teaching laboratories. Preferably, the system includes a first (relatively available) fully functional instrument, such as an optical microscope, and a mock-up of a second (typically less available) instrument that includes at least some controls, but is not fully functional. The student can operate the first instrument to form a real image. The student can also operate the controls of the second instrument, but the second (not fully functional) instrument does not form an actual image. Instead, the controls of the second instrument interface with a computer simulation to display an image (or other output) either produced previously by a functional instrument or generated by a computer.

The first instrument could comprise, for example, an optical microscope that would allow students to examine and/or position a sample. The sample could then be "examined" using a second instrument or "simulator" that mimics the operation of an actual instrument. The second instrument could comprise, for example, a simulator that closely resembles an electron microscope. The second instrument that is less than fully functional may simulate an actual analytical instrument that is less available because of cost, safety concerns, or other reasons that make it more difficult for an academic institution to have a fully functional tool to use in training.

Once the sample is loaded into the second instrument, a simulated output could be displayed. For example, a previously recorded series of SEM images of a similar sample could be stored in software, and those previously recorded images would be displayed and adjusted as the student operates the controls on the mock-up. The simulated output is not limited to images, but can also be, for example, spectrographs or other analytical output. The student could operate controls on the SEM mock-up to change the magnification or focus, and the simulation images would show a change in magnification and focus. The student would then adjust the controls to produce a desired image, thereby learning the interaction between various operating parameters of a real instrument.

In another preferred embodiment, the invention may consist solely of a mock-up instrument that includes the controls of an actual instrument. The student can operate the controls of the mock-up instrument, but the mock-up instrument does not form an actual image. Instead, the controls of the mock-up instrument interface with a computer simulation to display an image (or other output) either produced previously by a functional instrument or generated by a computer. The image (or other output) can be varied by the computer simulation based upon the physical settings manipulated by the student.

In either a two instrument or one instrument embodiment, the image can also be varied based upon additional information input into the simulation software such as sample prep data, various particle beam sources (for ion beam systems), probe tip shape (for AFM systems), etc. Further, the simulation can include various post-data collection measurements or manipulation such as various types of metrology software.

FIG. 1 shows a preferred embodiment of the present invention where an optical microscope 120 is combined with a scanning electron microscope ("SEM") simulator 130. Sample loader 112 would allow students to load the sample into a sample container 110 and then move the sample to a position for examination. The sample can be moved from the load position 114 to the optical microscope position 116 or to the electron microscope position 118. User interface 140 displays images or other output, either real or simulated, on a video monitor 141. Students can operate the optical microscope by way of either manual controls or a keyboard 142 or other input device on the user interface. The user interface will preferably comprise a desktop or laptop computer.

In a preferred embodiment, the optical microscope contains a real camera that provides real images of the sample. The optical microscope 120 can comprise an optical microscope camera, sometimes referred to as the navigation camera, which is positioned outside of the mock-vacuum chamber on the SEM simulator. The optical microscope camera 120 and sample loader 112 are preferably fully functional so that they function exactly like the navigation camera and sample loader on a fully functional SEM. The sample to be examined is loaded into a sample container 110. The sample container can then be moved under the navigation camera, which forms and stores a magnified digital image of the sample and preferably displays that image on video monitor 141.

Figure 2:
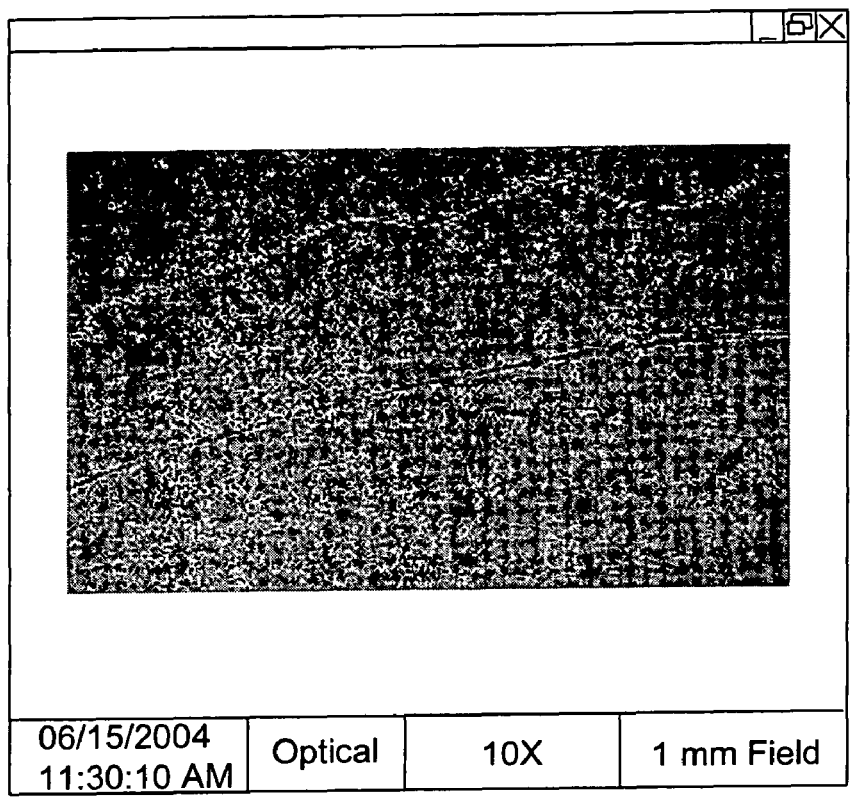
FIG. 2 shows a sample image from a fully functional optical microscope according to the present invention.

The optical microscope allows the teacher to begin the class showing the students something they can easily connect with (i.e. from an experiential perspective), i.e. a low magnification image of the sample. For example, FIG. 2 shows a 10× image of a human hair from an optical microscope. Increasing the magnification of the optical image can show some of the microstructure of the sample. It also shows the limits of the optical microscopes and sets the stage for using the electron microscope. Preferably the low magnification electron microscope picture overlaps the high magnification optical image.

The images from the optical microscope can be recorded, for example, on a charge-coupled device (CCD) camera or other magnifying camera and displayed in the same software environment as the SEM images. In the simplest case, the optical microscope can consist only of a fixed, low-magnification (e.g. 10×) web cam. The software simulator can also contain pre-taken optical images of a sample at different magnifications. Preferably, the camera can move up and down, either manually or by way of an electric motor, to focus on the sample. The camera preferably has a field of view of about 8 mm by 8 mm.

Once the sample has been examined using the optical microscope, the sample can be moved from the optical microscope position to the SEM simulator position. SEM simulator preferably closely resembles an actual SEM. The fully functional SEM that is simulated is preferably a smaller unit such as the table-top SEM described in U.S. patent application Ser. No. 12/303,711 entitled "Compact Scanning Electron Microscope" filed by Bierhoff et al. on Jun. 7, 2006 and assigned to the assignee of the present invention. Skilled persons will recognize that the first functional instrument and the second instrument simulator can be two separate units or can be housed together.

Figure 3:
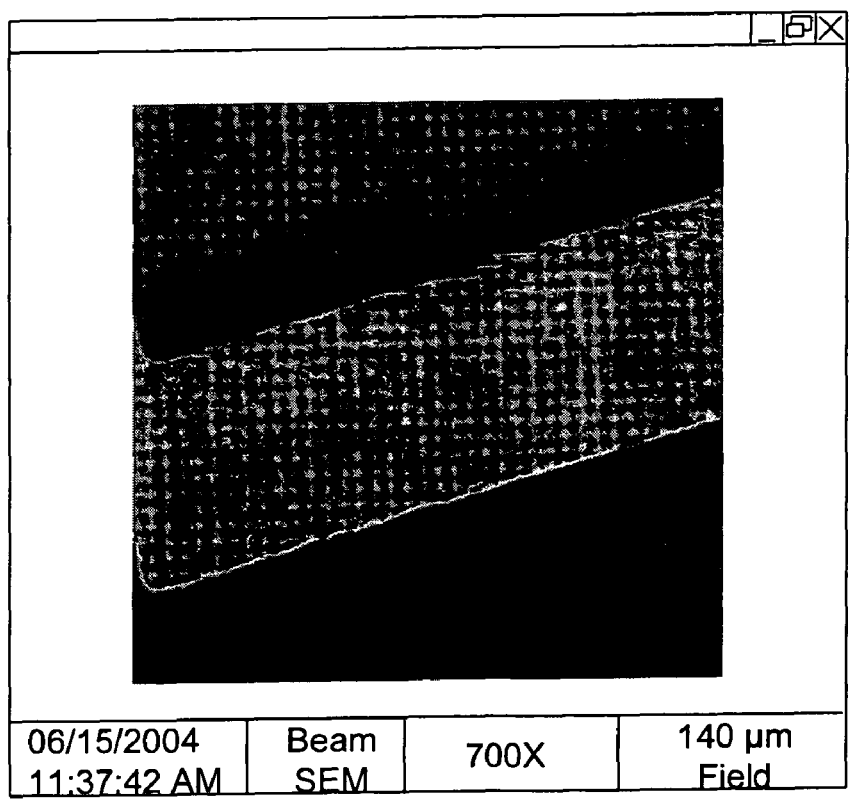
FIG. 3 shows a stored SEM image of a sample similar to the sample shown in FIG. 2 at a magnification of 700×.
Figure 4:
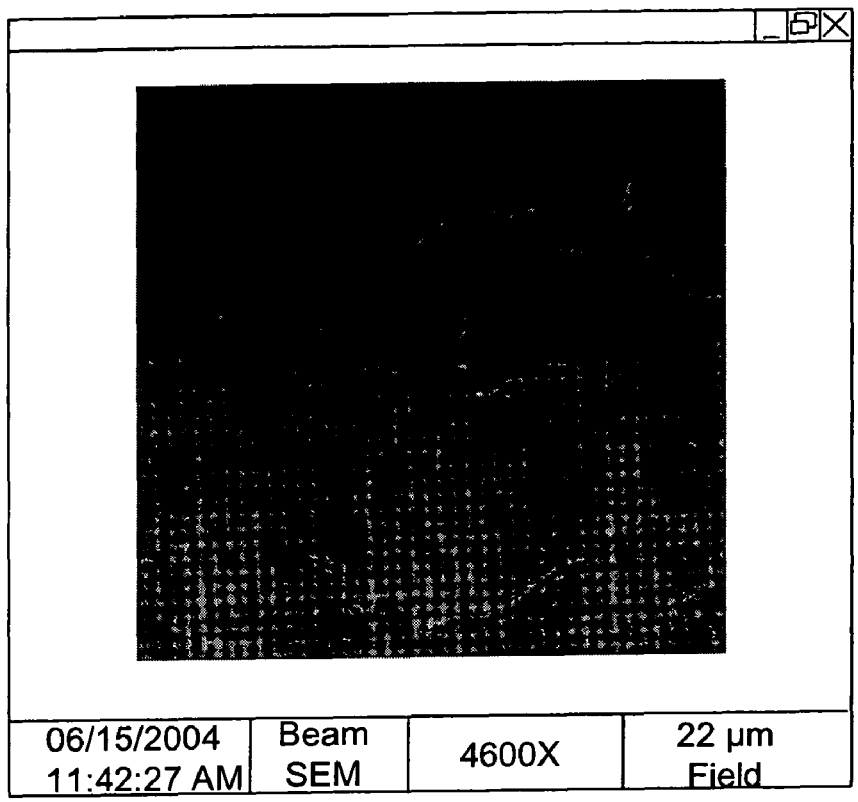
FIG. 4 shows a stored SEM image of a sample similar to the sample shown in FIG. 2 at a magnification of 4600×.

When the sample is moved under the SEM simulator, the software ("SW") simulator takes over and provides previously stored SEM images taken from the same or a similar sample but on a real SEM. FIG. 3 and FIG. 4 show examples of stored SEM images of a human hair like the sample shown in FIG. 2 but at much higher magnification. Software algorithms are used to simulate the typical functions of an SEM such as stage motion, magnification, focus and stigmation, image integration, and image save. The SW simulator can provide the same interaction between the instrument controls that occur in a real instrument. For example, changing the energy of the electron beam may affect the focus and stigmation. In the simulation, changing one operating parameter will affect other properties in the same manner as those properties interact in a real instrument. The student can therefore learn how to operate a complex instrument.

The images could be displayed on monitor as if the second instrument were a fully functional electron microscope. As a user operates controls on the hardware portion of the simulator (either manual controls on the SEM simulator itself or controls operated by way of user interface) the computer generated simulated images change in a manner similar to the way in which the images of a fully functional instrument change. For example, FIG. 3 shows the sample at a magnification of 700×. When the student operates the controls to increase magnification, the SW simulator could display the image shown in FIG. 4, which shows a magnification of 4600×.

The present invention can be extended to many examples. For example, a real mini-SEM could be used for live imaging and a SW simulator used to provide simulated X-Ray analysis. Virtually any type of analytical instrument could be used, either alone or in combination, including TEMs, SPMs, AFMs, FIBs, etc. Even where no fully functional instrument is present, the present invention would still preferably include a real functional sample loading and handling apparatus. The preferred embodiment thus provides a tool for use in education that combines real functionality and simulated functionality where at least one function of the tool is real.

In a preferred embodiment, the present invention will incorporate Commutative Image Reversibility to more accurately replicate the behavior of a real imaging instrument and provide for a more realistic educational experience by the user of the simulator. In a real imaging device, the quality of the image depends upon a variety of parameters such as brightness, contrast, stigmation, focus, probe alignment, noise, etc. To simulate the behavior of the instrument, it is necessary that the image processing functions applied to the displayed image be reversible, independent of the sequence in which they are originally applied. For example, assume that an initial base image has its contrast adjusted, followed by a brightness adjustment, followed by another contrast adjustment, as is typical when adjusting the image of an actual SEM. If we were to represent the changes a user makes in image contrast on a real machine as C, and the return to the original contrast as C-1, and similarly brightness as B and B-1, then if a user changes the observed image by the sequence C→B→C, then he can get back to the original image quality by any permutation of the inverse steps: C-1→C-1→B-1, B-1→C-1→C-1, or C-1→B-1→C-1, etc.

However, this is not the way traditional image processing programs work. Using a typical image-processing program, it is not possible to return to the original image by simply inversing the sequence of applied image processing applications, even for linear transformations such as brightness and contrast. The standard definition of brightness adjustment for traditional image processing is to add a constant offset value to every pixel's gray level such that the New pixel gray value=Old pixel gray value+Offset.

When the new pixel value is less than 0, the value is set to zero, which is the minimum value a brightness value can logically posses. When the new value is greater than 255, the value is clipped to the value 255. In cases where the image is more than 8-bits deep (so that the there are more than 256 gray levels available) the basic principles of clipping still occur at the end points of the dynamic range. Once data has been clipped, there is no mathematical trickery that can restore the original value; hence standard image processing packages can not restore the original image. A similar result is obtained using the contrast function, which can be defined as New pixel gray value=255*(Old pixel gray value−new lower limit)/(new upper limit−new lower limit).

Even in the restrictive case in which no data clipping occurs when each of the two above functions is applied to the image, when the mathematical inverses of the above equations are applied, the original gray level is not obtained. Instead, different values are obtained depending on the sequence with which the inverse formulas are applied. It is for this reason that most image processing packages such as PhotoShop, Image J, etc., prompt or at least allow the user to first store the original image before making changes to the image.

Figure 5:
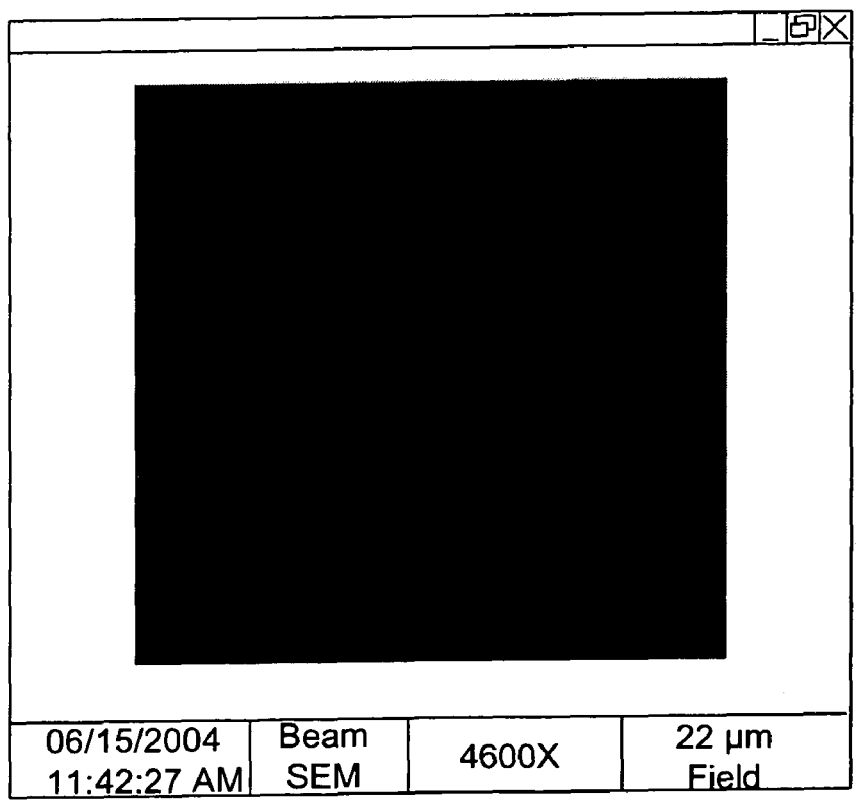
FIG. 5 shows the stored SEM image of FIG. 4 where the brightness and contrast values for the image have been changed.

A real machine, such as an SEM, does not behave in this manner. In a real machine, if a user first moves the brightness knob, then the contrast knob, then the focus knob, he can obtain the original image quality by setting all knobs back to their original positions—regardless of the sequence in which the knobs are reset. In a preferred embodiment of the present invention, image-processing algorithms are used to mimic the true image reversibility of a real machine. For example, FIG. 5 shows the sample of FIG. 4 at different brightness and contrast levels. In a preferred embodiment of the present invention, a reverse adjustment of brightness and contrast levels should be able to return the image shown in FIG. 5 to the exact image shown in FIG. 4, just as a user would see during the operation of a fully functional SEM. The algorithmic implementation of commutative image reversibility allows a simulator to give the user a more realistic experience of operating a machine.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. An analytical instrument simulator comprising:
    a functional first instrument of a first analytical instrument type capable of producing images of a specimen physically loaded into the first instrument, the images being displayed for viewing by an operator
    a simulated instrument including hardware simulating an analytical instrument of a second analytical instrument type into which the specimen can also be physically loaded, the simulated instrument including user controls which correspond to those of a functional instrument of the second instrument type which is being simulated, and the simulated instrument being less than fully functional and not capable of analyzing a specimen to produce the data output that would be produced by a functional instrument of the second analytical instrument type; and
    a computer operably connected to both the first instrument and the simulated instrument and programmed to:
    display images of the specimen generated by the first instrument,
    display simulated data output corresponding to output from a functional instrument of the second instrument type for a sample of the same type as the specimen imaged by the first instrument, and
    manipulate the simulated data output in accordance with input from the user controls for the simulated instrument in substantially the same manner that data output produced by a fully functional instrument of the second instrument type would be manipulated by corresponding input from the user controls for the functional instrument of the second instrument type.

2. The simulator of claim 1 in which the first instrument type comprises an optical microscope and the second instrument type comprises an electron microscope.

3. The simulator of claim 1 in which the simulated data output comprises simulated images of a sample of the same type as the specimen.

4. The simulator of claim 3 in which the simulated images comprise stored images of a sample of the same type as the specimen previously produced by a functional instrument of the type being simulated.

5. The simulator of claim 1 in which the simulated data output comprises output created entirely by the computer.

6. The simulator of claim 4 wherein manipulating the simulated images comprises changing the images to simulate a change in stage position, magnification, focus, or stigmation.

7. The simulator of claim 4 wherein manipulating the simulated images comprises changing the brightness or contrast of the displayed simulated images.

8. The simulator of claim 7 wherein manipulating the simulated images comprises a series of image processing steps which change the appearance of the displayed image, said image processing steps being reversible, independent of the sequence in which they are applied, so that the original simulated image can be restored after said image processing steps are applied.

9. The simulator of claim 1 further comprising metrology software for determining at least one dimension of a feature of a sample of the same type as the specimen from the simulated data output.

10. The simulator of claim 1 in which the first instrument and the simulated instrument are contained within a common housing.

11. An education aid for teaching student about the operation of an instrument, the aid comprising:
a first instrument functional to form an image of a specimen physically loaded into the first instrument, the first instrument being of a first instrument type, the images being displayed for viewing by an operator;
a second instrument of a second instrument type into which the same specimen can also by physically loaded, the second instrument including hardware simulating an analytical instrument of a second analytical instrument type and including user controls which correspond to those of a functional instrument of the second instrument type which is being simulated, wherein the second instrument is not fully functional and is not capable of analyzing a specimen to produce the data output that would be produced by a functional instrument of the second analytical instrument type;
a computer-accessible memory storing images from a functional instrument of the second type;
a computer operably connected to both the first instrument and the simulated instrument and programmed to:
display images generated by the first instrument,
display at least some of the stored images from the functional instrument of the second type, and
manipulate the images from the fully functional instrument of the second instrument type in accordance with input from the user controls on the second instrument to provide the user with a simulation of a fully functional instrument of the second type.

12. The apparatus of claim 11 in which the first type of instrument comprises an optical microscope and the second type of instrument comprises an electron microscope.

13. The apparatus of claim 11 in which:
instruments of the second type are characterized by multiple operating parameters that affect the image produced;
input from user controls on instruments of the second type alters the operating parameters; and
the computer program alters the image in accordance with the changes in the user controls on the second instrument, the image alteration simulating the manner in which user controls would alter an image on a functional instrument of the second type.

14. The apparatus of claim 13 in which a user adjustment of a user control controlling a first operating parameter causes the computer program to alter the image to simulate a change in the first and in a second operating parameter, requiring the user to adjust a second user control to achieve a clear simulation image.

15. The apparatus of claim 11 in which the first type of instrument comprises an electron microscope and the second type of instrument performs X-ray analyses.

16. A method of teaching students to operate an instrument, comprising:
providing a functional first instrument of a first analytical instrument type capable of producing images of a specimen physically loaded into the first instrument, the images being displayed for viewing by an operator;
providing a second instrument including hardware simulating an analytical instrument of a second analytical instrument type into which the same specimen can also be physically loaded, the second instrument including user controls which correspond to those of a functional instrument of the second instrument type which is being simulated, wherein the second instrument is not fully functional and is not capable of analyzing a specimen to produce the data output that would be produced by a functional instrument of the second analytical instrument type;
loading a physical specimen into the first instrument and obtaining an image of the specimen;
loading a the physical specimen into the hardware simulating an analytical instrument;
generating computer simulated data output for the simulated analytical instrument for a sample of the same type as the specimen, the simulated data output corresponding to data output that would be produced by a fully functional instrument of the second analytical instrument type for a sample of the same type as the specimen, and displaying the simulated output on a computer display screen, the simulated output being responsive to operation of the user controls for the hardware.

17. The method of claim 16 further comprising providing a functional instrument of a different type than the analytical instrument being simulated; and
displaying an image of the specimen produced by the functional instrument on a computer display screen.

18. The method of claim 17 in which the functional instrument is an optical microscope and the simulated instrument is an electron microscope.

19. The method of claim 17 in which the output of the simulated instrument and the image produced by the functional instrument are magnified images and in which the magnification capability of the functional instrument and the magnification of the simulated output of the simulated instrument overlap.

20. A system for simulating the operation of a sample imaging instrument, the system comprising:

a simulator comprising hardware into which a sample can be physically loaded, the simulator being incapable of imaging the sample, said simulator having user-operated controls which correspond to those of the sample imaging instrument being simulated;

a computer-accessible memory storing data output from a fully functional sample imaging instrument of the type being simulated;

a computer programmed to:

once a sample has been physically loaded into the simulator, display at least some of the stored data output on a computer display screen, the displayed output corresponding to output from a fully functional sample imaging instrument of the type being simulated for a sample of the same type as the loaded sample alter the displayed data output from the fully functional sample imaging instrument in accordance with input from the user-operated controls for the simulator in substantially the same manner that displayed data output produced by a fully functional sample imaging instrument of the type being simulated would be altered by corresponding input from the user-operated controls for the fully functional instrument.

21. The system of claim 20 in which the simulator has at least one functional feature in common with the functional sample imaging instrument of the type being simulated.

22. The system of claim 21 in which the at least one functional feature in common with the functional sample imaging instrument comprises a sample loader for holding a sample and loading it into the simulator in the same manner that a sample is loaded into the functional sample imaging instrument.

23. The system of claim 20 in which the sample imaging instrument being simulated is an electron microscope.

24. The system of claim 20 further comprising a fully functional sample imaging instrument of a different type than the sample imaging instrument being simulated, said fully functional sample imaging instrument being capable of imaging the loaded sample and said image being displayed on a computer display screen.

25. The simulator of claim 1 in which a specimen is loaded into the first instrument by loading the specimen into a specimen container and moving the specimen container to a position where the specimen can be imaged by the first instrument and in which specimen container can then be moved to a position relative to the simulated instrument corresponding to the position where the specimen could be analyzed by a functional instrument of the second instrument type.

* * * * *